United States Patent
Cheng et al.

(10) Patent No.: US 8,150,412 B2
(45) Date of Patent: Apr. 3, 2012

(54) INTERFERENCE MITIGATION IN A WIRELESS COMMUNICATION SYSTEM

(75) Inventors: Fang-Chen Cheng, Randolph, NJ (US); Lei Song, Randolph, NJ (US); Shupeng Li, Edison, NJ (US)

(73) Assignee: Alcatel Lucent, Paris (FR)

( * ) Notice: Subject to any disclaimer, the term of this patent is extended or adjusted under 35 U.S.C. 154(b) by 1680 days.

(21) Appl. No.: 11/368,790

(22) Filed: Mar. 6, 2006

(65) Prior Publication Data
US 2007/0207828 A1    Sep. 6, 2007

(51) Int. Cl.
*H04W 72/00*    (2009.01)
(52) U.S. Cl. .............. 455/453; 455/522; 455/562.1; 370/278; 370/319; 370/428
(58) Field of Classification Search .......... 370/278, 370/319, 428, 338, 329; 455/522, 453, 562.1
See application file for complete search history.

(56) References Cited

U.S. PATENT DOCUMENTS

| | | | | |
|---|---|---|---|---|
| 7,162,250 | B2 * | 1/2007 | Misra ............... | 455/453 |
| 2002/0077138 | A1 * | 6/2002 | Bark et al. ............. | 455/522 |
| 2002/0187786 | A1 * | 12/2002 | Takano et al. ............. | 455/442 |
| 2004/0223507 | A1 * | 11/2004 | Kuchibhotla et al. ......... | 370/428 |
| 2005/0030911 | A1 * | 2/2005 | Tiedemann et al. ........... | 370/278 |
| 2006/0014554 | A1 * | 1/2006 | Gerlach ............. | 455/501 |
| 2006/0040669 | A1 * | 2/2006 | Innami ............. | 455/442 |
| 2006/0165032 | A1 * | 7/2006 | Hamalainen et al. ......... | 370/328 |
| 2007/0026810 | A1 * | 2/2007 | Love et al. ............. | 455/67.11 |
| 2007/0147536 | A1 * | 6/2007 | Melzer et al. ............. | 375/267 |
| 2007/0274343 | A1 * | 11/2007 | Nishio ............. | 370/479 |
| 2008/0130593 | A1 * | 6/2008 | Scheinert et al. ............. | 370/337 |
| 2009/0156248 | A1 * | 6/2009 | Hamabe ............. | 455/522 |

OTHER PUBLICATIONS

3GPP TS25.211v6.7.0 Physical Channels and Mapping of Transport Channels onto Physical Channels (FDD) (Release 6) Dec. 2005 pp. 1-50.
3GPP2 TSG-C.R1002 Technical 1xEV-DV Evaluation Methodology (V14) 2003 pp. 1-146.

* cited by examiner

*Primary Examiner* — Patrick Edouard
*Assistant Examiner* — Julio Perez
(74) *Attorney, Agent, or Firm* — Williams, Morgan & Amerson, PC

(57) ABSTRACT

The present invention provides a method of interference mitigation in a wireless communication system. The method that may include reducing transmission power associated with at least one first channel provided by at least one first base station associated with at least one corresponding first coverage area adjacent a second coverage area associated with a second base station concurrently with maintaining at least one transmission power associated with the second base station(s). The method may also include increasing the transmission power associated with the first channel(s) provided by the first base station(s) concurrently with reducing at least one transmission power associated with at least one first channel provided by the second base station(s).

20 Claims, 5 Drawing Sheets

INTERFERENCE MITIGATION IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. A base station (or alternatively a node-B, base station router, or access network) typically provides wireless connectivity to mobile units located in each cell. The mobile units may include devices such as mobile telephones, personal data assistants, smart phones, text messaging devices, Global Positioning System devices, wireless network interface cards, desktop or laptop computers, and the like. Mobile units located in each cell may access the wireless communications system by establishing a wireless communication link, often referred to as an air interface, with the base station that serves the cell.

The performance of a wireless communication system is typically determined by a signal-to-noise ratio (SNR) associated with signals received by the mobile units. The noise received by the mobile units includes thermal noise and interference from transmissions associated with other mobile units and/or base stations. The interference from transmissions associated with other mobile units within the same cell is typically fairly small because the downlink radio channels are substantially orthogonal to each other. For example, downlink transmissions to mobile units within the same cell may be encoded with orthogonal coding sequences. However, interference from transmissions associated with mobile units in adjacent cells may be significant, at least in part because the downlink radio channels used by base stations that serve adjacent cells are not typically orthogonal. Compared to mobile units located near the center of a cell, mobile units located near the edge of the cell may receive relatively weaker signals from the serving base station and relatively more inter-cell interference from base stations in neighboring cells. Thus, mobile units near the cell edge are likely to experience the largest degradation in the signal-to-noise ratio.

Reducing the maximum transmission power for base stations in adjacent cells may reduce the inter-cell interference experienced by mobile units near the cell edge. For example, the average power per channel could be reduced while maintaining the same number of radio channels, e.g., by scheduling high-speed data users on relatively high quality radio channels that require less energy per symbol than relatively poor quality channels. However, reducing the average power per channel is equivalent to shrinking the overall cell coverage associated with the base station. For another example, the number of radio channels could be reduced while maintaining the average power per channel. However, reducing the number of radio channels is equivalent to reducing the overall system capacity.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for interference mitigation in a wireless communication system. The method that may include reducing transmission power associated with at least one first channel provided by at least one first base station associated with at least one corresponding first coverage area adjacent a second coverage area associated with a second base station concurrently with maintaining at least one transmission power associated with the second base station(s). The method may also include increasing the transmission power associated with the first channel(s) provided by the first base station(s) concurrently with reducing at least one transmission power associated with at least one first channel provided by the second base station (s).

BRIEF DESCRIPTION OF THE DRAWINGS

The invention may be understood by reference to the following description taken in conjunction with the accompanying drawings, in which like reference numerals identify like elements, and in which.

Figure 1:
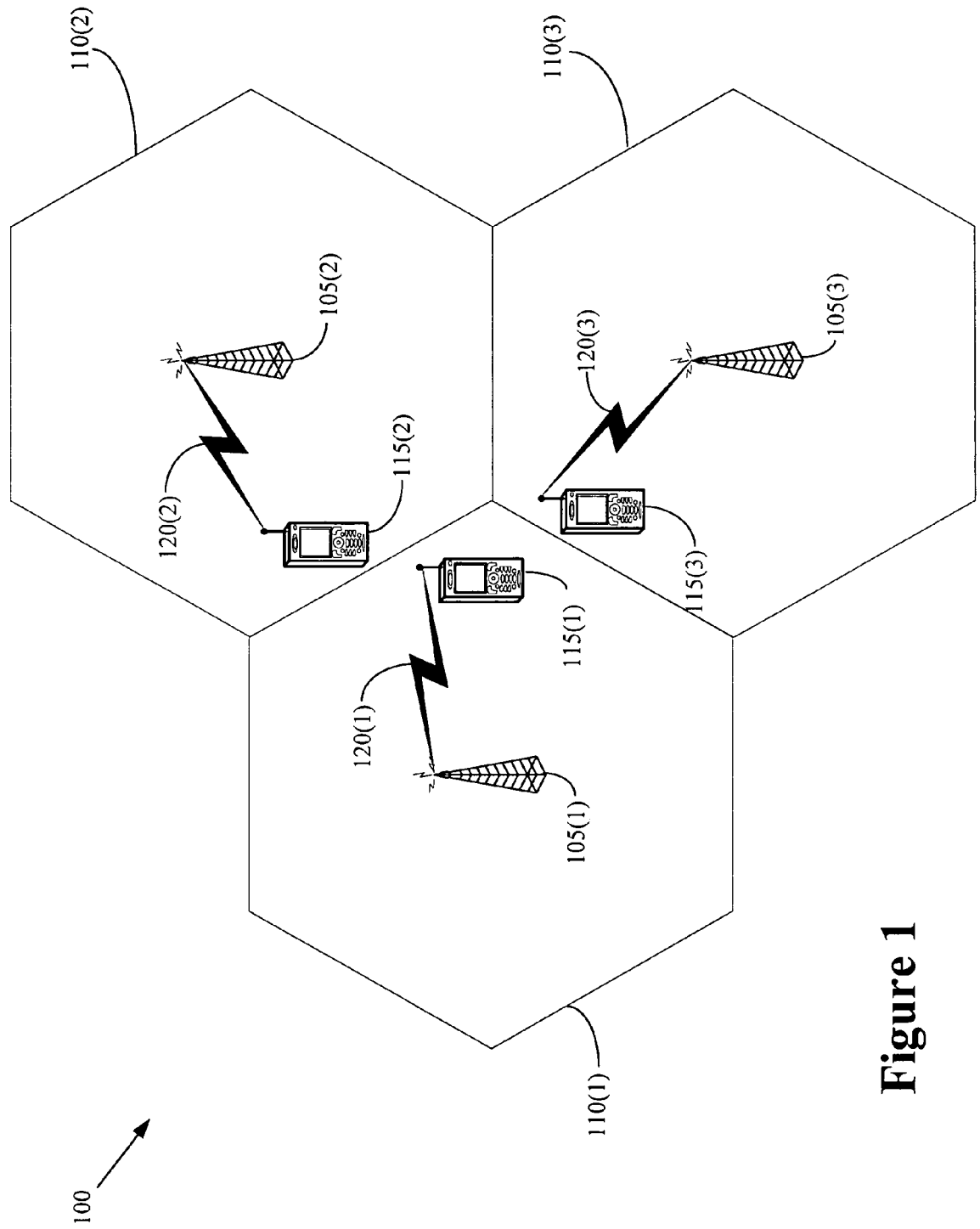
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a plurality of base stations 105(1-3) that provide wireless connectivity to corresponding coverage areas, or cells 110(1-3). The indices (1-3) may be used when referring to individual base stations 105(1-3) and/or cells 110(1-3), or subsets of the base stations 105(1-3) and/or cells 110(1-3). However, these indices may be dropped when the base stations 105 and/or the cells 110 are referred to collectively. This convention may also be applied to other entities depicted in the drawings. The base stations 105 may provide wireless connectivity according to one or more standards, systems, and/or protocols. In one embodiment, the base stations 105 may provide wireless connectivity according to one or more Universal Mobile Telecommunication System (UMTS) standards or protocols. Alternatively, the base stations 105 may provide wireless connectivity according to one or more Evolution-Data Optimized (EV-DO) standards or protocols. However, the present invention is not limited to these standards or protocols and in alternative embodiments any standard or protocol may be used. For example, the base stations 105 may operate according to one or more Code Division Multiple Access (CDMA, CDMA 2000) and/or Orthogonal Frequency Division Multiple Access (OFDMA) protocols.

Mobile units 115 in the cells 110 may establish wireless communication links 120 with corresponding base stations 105. Techniques for establishing, maintaining, and/or tearing down the wireless communication links 120 are known to persons of ordinary skill in the art and in the interest of clarity only those aspects of establishing, maintaining, and/or tearing down the wireless communication links 120 that are relevant to the present invention will be discussed further herein. The wireless communication links 120 may include a plurality of downlink (or forward link) and/or uplink (or reverse link) channels. The channels may include one or more dedicated channels that may be allocated to a single mobile unit 115 and/or one or more common control channels that may be used to carry signaling and/or control information between base stations 105 and mobile units 115. Exemplary dedicated channels may include a UMTS downlink dedicated channel (DL DCH) and exemplary common control channels may include a common pilot channel (CPICH) as well as other broadcast and/or paging channels.

Transmission powers may be allocated to the dedicated channels and the common control channels, e.g., by the base stations 105 or by some other entity in the wireless communication system 100 such as a radio network controller (not shown). The power used to transmit over the common control channels may remain approximately constant over time. For example, the mobile units 115 may use signals transmitted over the common pilot channel to determine the quality of the wireless communication links 120 by assuming that the signals were transmitted over the common pilot channel by the base stations 105 at a known power. The power used to transmit over the dedicated channels may be power controlled, e.g., the transmission power may be varied based on a class of service and/or a quality of service requirement associated with the mobile units 115. For example, the base stations 105 may receive channel quality information (CQI) or data rate control (DRC) information from the mobile units 115 indicating the quality of the wireless communication link 120. The base stations 105 may then determine the power that should be used to transmit over the dedicated channels based on the CQI and/or DRC information provided by the mobile units 115.

The wireless communication links 120 may also include one or more shared data channels that may be allocated to more than one mobile unit 115. In embodiments of the wireless communication system 100 that operate according to UMTS standards or protocols, the shared data channels may include one or more high-speed downlink packet access (HS-DPA) shared physical channels. In embodiments of the wireless communication system 100 that operate according to EV-DO standards or protocols, the shared data channels may include one or more EV-DO forward link (FL) channels. However, persons of ordinary skill in the art having benefit of the present disclosure should appreciate that the present invention is not limited to these particular shared data channels and in alternative embodiments other shared data or traffic channels may be used.

A portion of the total power budget allocated to each base station 105 that has not been allocated to either the dedicated channels or the common control channels may be used by the shared data channels. Interference between transmissions by the base stations 105 in the adjacent cells 110 may be mitigated by coordinating allocation of the power used to transmit over the shared data channels. In one embodiment, the transmission power used by the base station 105(1) to transmit information over the shared data channels may remain approximately constant at approximately the maximum allocated transmission power, while the transmission power used by the neighboring or adjacent base stations 105(2-3) may be reduced to mitigate the interference associated with the base stations 105(2-3). Each of the base stations 105(2-3) may subsequently be allowed to transmit over the shared data channels at approximately the maximum allocated transmission power while the transmission powers used by the other base stations 105 to transmit over the shared data channels may be reduced, as will be discussed in detail below.

Figure 2:
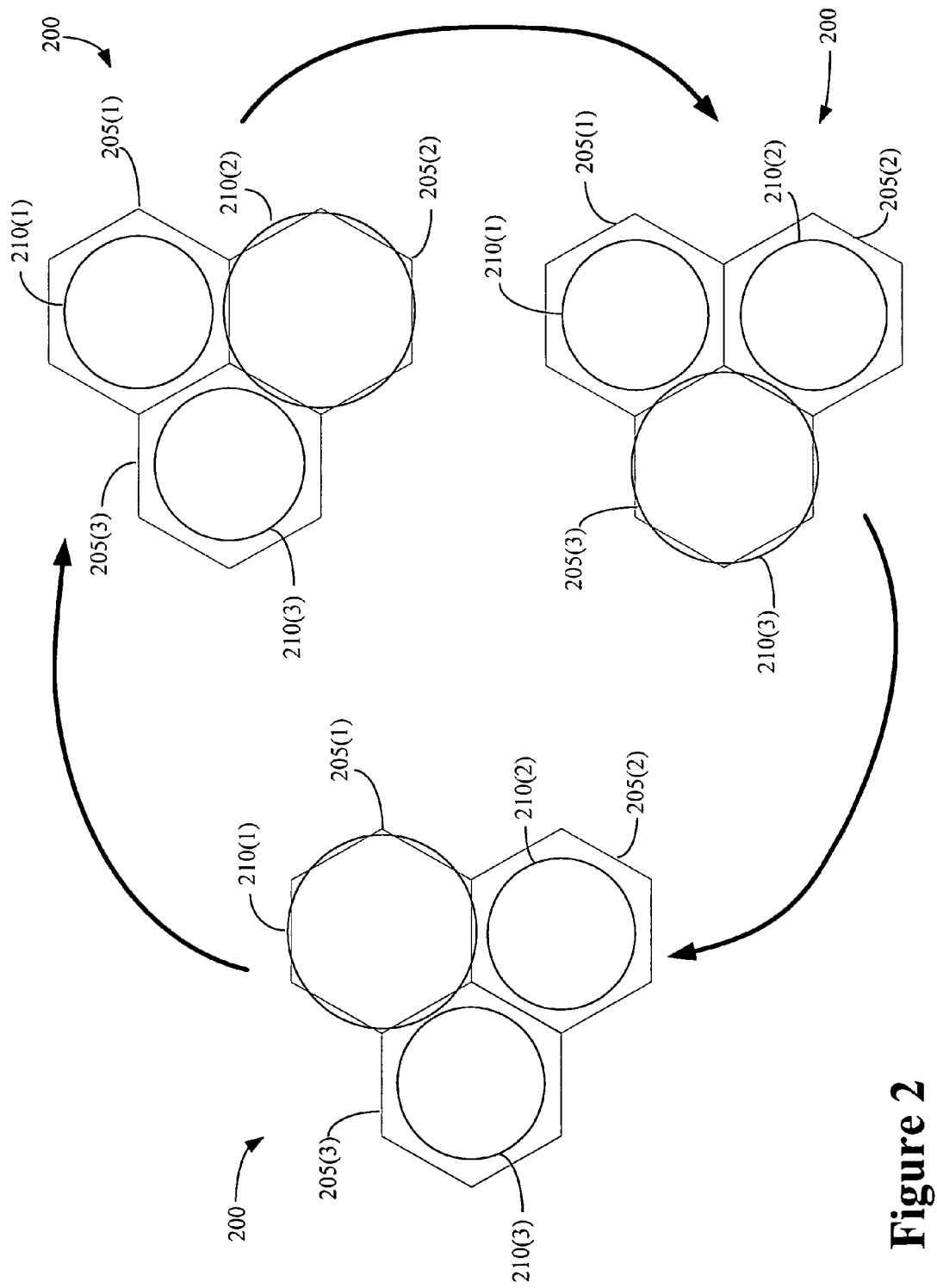
FIG. 2 conceptually illustrates one exemplary embodiment of the variation in coverage area for a wireless communication system, in accordance with the present invention FIG. 3 conceptually illustrates one exemplary embodiment of a timing diagram, in accordance with the present invention.

FIG. 2 conceptually illustrates the variation in coverage area for one exemplary embodiment of a wireless communication system 200. In the illustrated embodiment, the wireless communication system 200 includes three adjacent cells 205. However, persons of ordinary skill in the art having benefit of the present disclosure should appreciate that the wireless communication system 200 may include any number of cells 205, which may or may not be adjacent each other. The transmission power for shared channels in the adjacent cells 205 is coordinated so that only one of the cells 205 is transmitting at approximately the maximum available transmission power for the shared channels. The transmission power for shared channels in the other cells 205 may be reduced to mitigate interference from the cells.

The wireless communication system 200 is depicted during three time intervals. In the first time interval, which is depicted at the left-hand side of FIG. 2, the transmission power allocated to shared channels in the cell 205(1) is maintained at approximately the maximum available transmission power for the shared channels, as indicated by the circle 210(1). The transmission power allocated to shared channels in the adjacent cells 205(2-3) has been reduced to below the maximum available transmission power for the shared channels, as indicated by the circles 210(2-3). In the second time interval, which is subsequent to the first time interval and is depicted at the upper right of FIG. 2, the transmission power allocated to shared channels in the cell 205(2) is increased to approximately the maximum available transmission power for the shared channels, as indicated by the circle 210(2). The transmission power allocated to shared channels in the adjacent cells 205(1, 3) has been reduced to below the maximum available transmission power for the shared channels, as indicated by the circles 210(1, 3). In the third time interval, which is subsequent to the second time interval and is depicted at the lower right of FIG. 2, the transmission power allocated to shared channels in the cell 205(3) is increased to approximately the maximum available transmission power for the shared channels, as indicated by the circle 210(3). The transmission power allocated to shared channels in the adjacent cells 205(1-2) has been reduced to below the maximum available transmission power for the shared channels, as indicated by the circles 210(1-2).

Referring back to FIG. 1, wireless communications within the cells 110 may be synchronized, which may improve the coordination of the alternative cell coverage variations for the shared data channels described above. For example, transmissions by the base stations 105 in an EV-DO wireless communication system 100 may be synchronized through a Global Positioning System (GPS). Consequently, the frame boundaries of each sub-packet in the EV-DO wireless communication system 100 may be time aligned among the cells 110 in the transmission powers associated with shared data channels provided by the base stations 105 may be varied during any time interval.

However, base stations 105 in a UMTS system have separate free running clocks and so transmissions by the base stations 105 may not be synchronized. In one embodiment, the $1^{st}$ transmission time interval (TTI) of the high speed packet downlink shared channels (HS-PDSCHs) may be time aligned with the primary common control physical channel (P-CCPCH) in each cell 110 and so the timing offset between cells could be done through Node B synchronization. However, the timing drift would never allow the TTI to closely align the downlink transmission among all cells 110. Thus, in one embodiment, a time interval may be determined during which each base station 105 may maintain, increase, or decrease the transmission power associated with the shared data channels.

Figure 3:
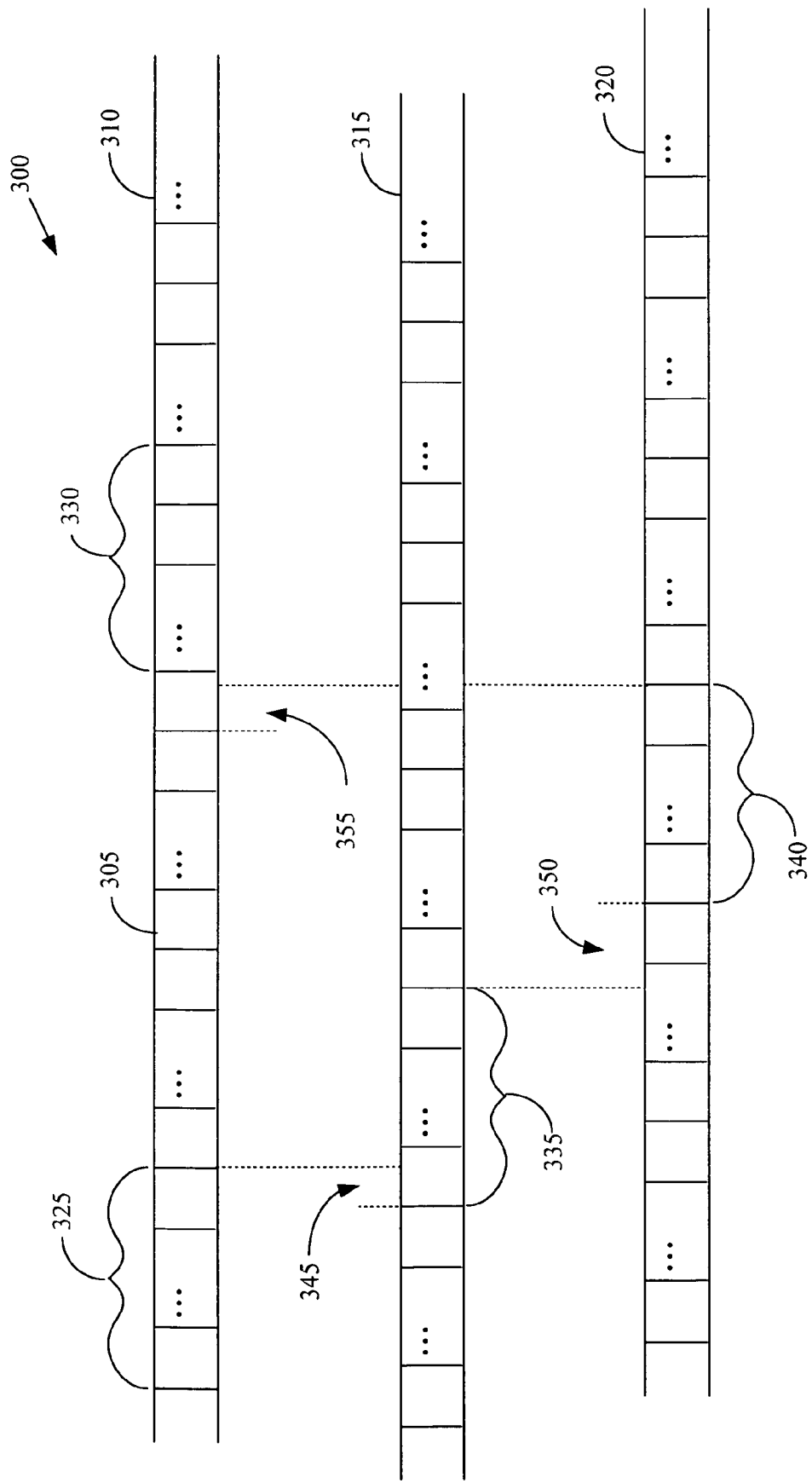

FIG. 3 conceptually illustrates one exemplary embodiment of a timing diagram 300. In the illustrated embodiment, sequences of transmission time intervals 305 (only one indicated in FIG. 3) are depicted for the shared data channels provided by three base stations, such as the base stations 105 shown in FIG. 1. For example, the sequence 310 may be associated with the base station 105(1), the sequence 315 may be associated with the base station 105(2), and the sequence 320 may be associated with the base station 105(3). However, persons of ordinary skill in the art having benefit of the present disclosure should appreciate that any number of sequences may be used in the present invention. The sequences of 310, 315, 320 may not be synchronized, e.g., they may be associated with base stations having free running clocks such as the UMTS base stations.

The base stations may be configured to schedule mobile units located near the edge of the associated cell in groups of transmission time intervals 305. For example, the base station associated with the sequence 310 may be configured to schedule mobile units located near the edge of the cells in the groups 325, 330 of transmission time intervals 305. The base station associated with the sequence 315 may be configured to schedule cell edge mobile units during the group 335 and the base station associated with the sequence of 320 may be configured to schedule cell edge mobile units during the group 340. For example, the base stations may be pre-configured to schedule the cell edge users alternatively every 3*N transmission time intervals 305 so that edge users in each cell may be scheduled for the duration of N consecutive transmission time intervals 305. The variable N may be determined in any manner and some examples of techniques for determining N are described below.

The lack of the synchronization between the timing sequences 310, 315, 320 may result in overlapping groups and/or time periods during which none of the associated base stations are scheduling cell edge mobile units. For example, the timing sequence 310 and the timing sequence 315 are not synchronized, which results in an overlap during the time period 345. The timing sequence 315 is not synchronized with the time sequence 320, which results in a time period 350 during which no base stations are scheduling mobile units at the cell edge. Furthermore, the timing sequence 310 is not synchronized with the timing sequence 320, which results in an overlap 355 between the timing sequences 310, 320. However, if N is increased, the percentage of time that includes an overlapping time interval between cells (or a time interval when no scheduling is taking place) may be reduced.

Delay constraints may be used to determine the duration of the groups 325, 330, 335, 340 and thereby determine a minimum value of N. For example, in a UMTS system that implements HSDPA with HARQ, the base station expects ACK/NACK feedback of the HARQ process on the mobile unit approximately 7.5 ms after transmitting a sub-packet. The overall coordinated interval (3*N) for the edge cell scheduling in the interference mitigation scheme should be larger than the ACK/NACK feedback delay to allow retransmission in the same HARQ process. Therefore, N should be greater than or equal to 3. In some embodiments, the number could be optimized depending on the application and system load.

The duration of the groups 325, 330, 335, 340 may be predetermined, determined dynamically in response to changing channel conditions, or determined semi-dynamically to allow one cell to have a longer/shorter scheduling time than one or more neighboring cells. The semi-dynamic coordination scheme may be important when the cell loads are imbalanced among cells so that the cells having larger loads may be allocated a longer scheduling time in the cells having smaller loads may be allocated a shorter scheduling time. In the embodiments where the coordination scheme is dynamic, the interference mitigation scheme may allow the variation of the scheduling interval, maximum transmitted power, and timing coordination to be determined on the fly. A dynamic scheme may use signaling messages among cells and be coordinated through a radio network controller.

Referring back to FIG. 1, the base stations 105 may schedule communications that use the shared data channels. Schedulers (not shown) in the base stations 105 may receive channel quality feedback (CQI in UMTS and DRC in EV-DO) from the mobile units 115. The channel quality feedback may be based on signals transmitted over the common pilot channel. As discussed above, the transmission powers associated with the dedicated channels and the common control channels may remain approximately constant and the transmission powers associated with the shared channels may be increased, maintained, and/or reduced to mitigate interference between adjacent cells 110. Thus, the channel quality feedback received by the base stations 105 may not be consistent with the transmission powers associated with the shared data channels, particularly when the cell coverage is shrinking.

For example, the CQI (or DRC) may be derived from a signal-to-interference (SIR) measurement of the common pilot channel. The traffic channel SIR for mobile units 115 that are located near an edge of the cells 110 may vary as the transmission power used to transmit over the shared channels changes. For example, the interference mitigation schemes described above may improve the traffic channel SIR for the cell edge users. The traffic channel SIR may also vary for the center cell users due to the concurrent decrease of transmitted power and the decrease in inter-cell interference. In one embodiment, the traffic channel SIR could be modeled as a function ($f$) of several variables for optimization. The variables of the traffic channel SIR estimate include the current CQI feedbacks associated with a current time interval ($CQI_t$), heuristic CQI reports associated with a previous time interval ($CQI_{t-i}$), ACK/NACK feedbacks associated with a present time interval or a previous time interval provided by a hybrid automatic repeat request (HARQ) processor (e.g., $NACK_t$, $ACK_{t-i}$, etc), an estimated Doppler factor ($f_d$), and an interference estimate ($I_{IM}$) that may be fed back:

$$SIR_{IM} = f(SIR(CQI_t), SIR(CQI_{t-i}), Ack_{t-i}, f_d, I_{IM}) \quad (1)$$

The particular form of the function $f(\ )$ is a matter of design choice and not material to the present invention.

Different scheduling techniques may be applied for different wireless communication protocols. For example, in UMTS, the scheduler may estimate and predict the actual CQI of the traffic channel, determine the modulation and coding scheme, and estimate the transmitted power at the scheduled transmitted time based on the optimization of functional analysis output of the traffic channel SIR during inference mitigation. In EV-DO, the scheduler could optimize the transmitted power ratio for the given DRC in the interference mitigation scheme for the scheduled transmission sub-packet since the DRC value may not be changed at the base station 105. In one embodiment, the scheduler may estimate the actual traffic channel SIR by applying a scaling factor ($\alpha$) to the pilot SIR estimate based on current CQI report:

$$SIR_{IM} = \alpha * SIR(CQI_t) \quad (2)$$

The scaling factor ($\alpha$) may be different for the cell edge users and center cell users since the level of the interference reduction and the transmitted power reduction may be different between these groups of users. The scaling factor ($\alpha$) could also be dynamic with time based on the different CQI feedback. However, persons of ordinary skill in the art having benefit of the present disclosure should appreciate that other techniques for estimating and/or determining the SIR, as well as for scheduling mobile units 115, may be used.

Figure 4:
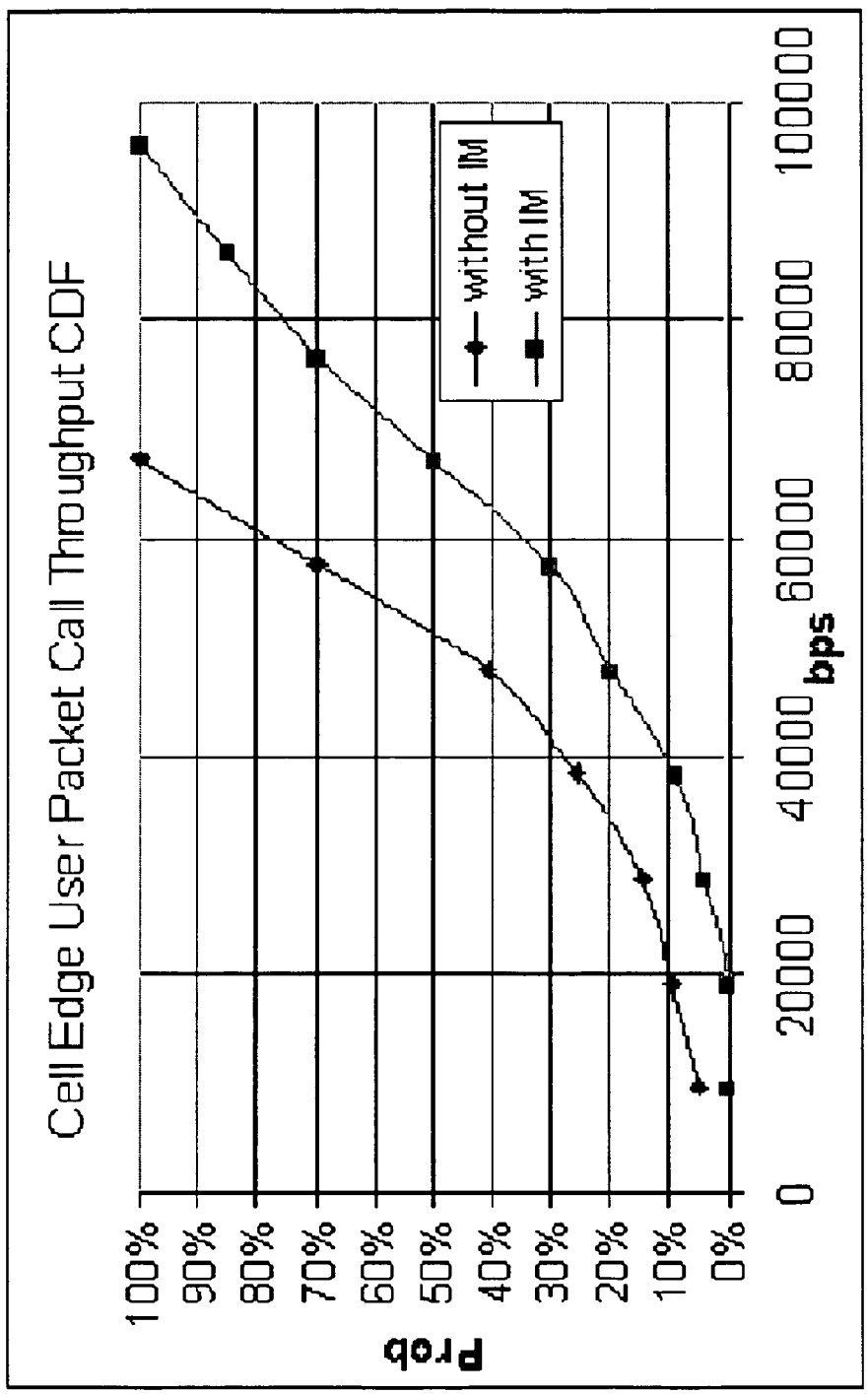
FIG. 4 shows cell edge user packet call throughput with and without interference mitigation, in accordance with the present invention.

FIG. 4 shows cell edge user packet call throughput with and without interference mitigation. In the illustrated embodiment, the horizontal axis indicates a data transmission rate in bits per second and the vertical axis indicates the probability of Cumulative distribution function (CDF) that a given mobile unit at a cell edge is able to achieve the corresponding data transmission rate. The lines plotted on the graph in FIG. 4 were determined using a simulation. In the simulation, a cellular system consisting of 19 wrap-around hexagonal cells was used and a base station was located at the center of each cell. The adopted propagation model is a modified Hata model. The simulation parameters are summarized in the table below.

TABLE 1

| Interference mitigation for HSDPA system level simulation parameters | |
|---|---|
| Parameter | Value Used |
| Cellular layout | Hexagonal grid, 3-cell/Node-B, total 19 Node-B, clover leaf |
| Site to Site distance | 2800 m |
| Antenna pattern | As proposed in [3] |
| Propagation model | L = 128.1 + 37.6 Log 10R |
| CPICH power | −10 dB |
| Other common channels | −10 dB |
| Std. Deviation of slow fading | 8.0 dB |
| BS antenna gain | 14 dB |
| UE antenna gain | 0 dBi |
| UE noise figure | 9 dB |
| BS Total Power | 20 w |
| Traffic Model | FTP |
| Fast HARQ scheme | IR combining |

FIG. 4 shows the cumulative distribution function (CDF) of packet call throughput of the cell edge users when an interference mitigation scheme such as described above is employed and when no interference mitigation scheme is employed. The cell edge throughput has achieved significant improvement through the proposed scheme in comparison with that without interference mitigation scheme. For example, only approximately 10% of the users located at the cell edge failed to achieve a call throughput of at least 40 kb per second when the interference mitigation scheme was employed, compared to the almost 30% of the cell edge users that failed to achieve a call throughput of at least 40 kb per second when no interference mitigation was employed.

Figure 5:
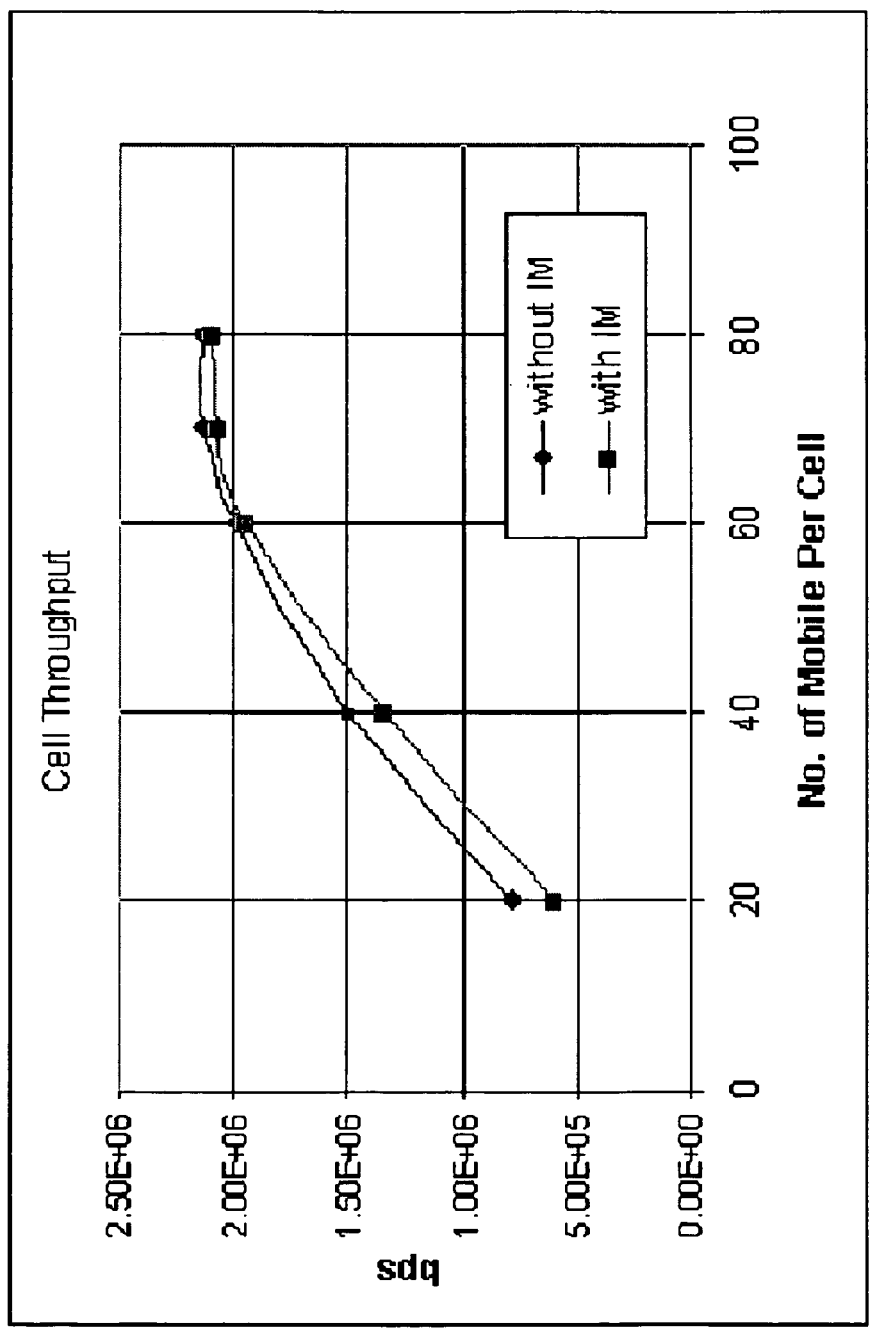
FIG. 5 shows average cell throughput with and without interference mitigation, in accordance with the present invention.

FIG. 5 shows average cell throughput with and without interference mitigation. In the illustrated embodiment, the horizontal axis indicates the number of mobile units within a cell and the vertical axis indicates the total cell throughput in bits per second. The cell throughput shown in FIG. 5 was determined using the same parameters as the simulation described above with respect to FIG. 4. In the illustrated embodiment, the total sector throughput for the interference mitigation system is roughly the same as that of the system without interference mitigation. Thus, employing an interference mitigation scheme for HSDPA may not reduce the total system spectral efficiency can system capacity.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of coordinating operation of a plurality of base stations, comprising:
    transmitting, from a first base station during a first time interval, signals at a first transmission power concurrently with a second base station transmitting signals at a second transmission power, wherein the first and second base stations serve adjacent coverage areas over a first channel, and wherein the first transmission power is greater than the second transmission power; and
    reducing transmission power of the first base station to the second transmission power during a second time interval subsequent to the first time interval and concurrently increasing transmission power of the second base station to the first transmission power, wherein the first and second time intervals and the corresponding transmission powers of the first and second base stations repeat according to a predetermined repeating pattern.

2. The method of claim 1, wherein reducing the transmission power of the first base station comprises reducing the transmission power associated with a shared first channel provided by the first base station.

3. The method of claim 2, wherein reducing the transmission power associated with the shared first channel provided by the first base station comprises reducing the transmission power associated with a shared high-speed downlink packet access channel provided by the first base station.

4. The method of claim 1, wherein reducing the transmission power associated with the first base station comprises reducing the transmission power associated with the first channel concurrently with maintaining at least one transmission power associated with at least one second channel provided by the first base station.

5. The method of claim 4, wherein maintaining said at least one transmission power of associated with said at least one second channel provided by the first base station comprises maintaining at least one transmission power of at least one of a dedicated channel and a common control channel provided by the first base station.

6. The method of claim 1, wherein reducing the transmission power associated with the first channel provided by the second base station comprises reducing the transmission power associated with a shared first channel provided by the second base station.

7. The method of claim 6, wherein reducing the transmission power associated with the shared first channel provided by the second base station comprises reducing the transmission power associated with a shared high-speed downlink packet access channel provided by the second base station.

8. The method of claim 1, wherein reducing the transmission power associated with the first channel provided by the second base station comprises reducing the transmission power associated with the first channel concurrently with maintaining at least one transmission power associated with at least one second channel provided by the second base station.

9. The method of claim 8, wherein maintaining said at least one transmission power associated with said at least one second channel provided by the second base station comprises maintaining at least one transmission power of at least one of a dedicated channel and a common control channel provided by the second base station.

10. The method of claim 1, comprising scheduling at least one mobile unit to the first channel provided by the first base station based on channel quality feedback received from said at least one mobile unit.

11. The method of claim 10, wherein scheduling said at least one mobile unit comprises determining a signal-to-interference ratio associated with said at least one mobile unit based on the channel quality feedback.

12. The method of claim 11, wherein determining the signal-to-interference ratio comprises determining the signal-to-interference ratio based on the transmission power associated with the first channel provided by the first base station.

13. The method of claim 11, wherein determining the signal-to-interference ratio comprises determining the signal-to-interference ratio based on channel quality indication feedback from a previous time interval.

14. The method of claim 11, wherein determining the signal-to-interference ratio comprises determining the signal-to-interference ratio based on acknowledgement feedback associated with a present time interval or a previous time interval provided by a hybrid automatic repeat request (HARQ) process.

15. The method of claim 11, wherein determining the signal-to-interference ratio comprises determining the signal-to-interference ratio based on an estimated Doppler frequency.

16. The method of claim 11, wherein determining the signal-to-interference ratio comprises determining the signal-to-interference ratio based on feedback of an estimated interference level.

17. A method of coordinating operation of a plurality of base stations, comprising:
    reducing, during at least one first time interval, transmission power associated with at least one first channel provided by at least one first base station associated with at least one corresponding first coverage area adjacent at least one second coverage area associated with at least one second base station concurrently with maintaining at least one transmission power associated with said at least one second base station; and increasing, during at least one second time interval subsequent to said at least one first time interval, the transmission power associated with said at least one first channel provided by said at least one first base station concurrently with reducing at least one transmission power associated with at least one first channel provided by said at least one second base station, wherein said at least one first time interval and said at least one second time interval are predetermined according to a repeating pattern, wherein a beginning and an end of said at least one first and second time intervals are determined independently by said at least one first base station and said at least one second base station according to free running clocks in said at least one first base station and said at least one second base station, and wherein the free running clocks are not synchronized.

18. The method of claim 17, wherein said at least one first base station preferentially schedules edge users during said at least one first time interval and said at least one second base station preferentially schedules edge users during said at least one second time interval.

19. The method of claim 18, comprising determining the first and second time intervals to reduce an overlap interval during which said at least one first and second base stations are both scheduling edge users or to reduce a time interval during which neither said at least one first nor second base stations are scheduling edge users.

20. The method of claim 19, wherein determining the first and second time intervals comprises determining the first and second time intervals based on a feedback delay associated with retransmission of at least one packet over said at least one first channel provided by the first base station.

* * * * *